United States Patent [19]
Lee

[11] Patent Number: 5,947,609
[45] Date of Patent: Sep. 7, 1999

[54] FLUID BEARING APPARATUS

[75] Inventor: Chang-woo Lee, Kyonggi-do, Rep. of Korea

[73] Assignee: Samsung Electronics Co., Ltd., Kyungki-do, Rep. of Korea

[21] Appl. No.: 08/959,320

[22] Filed: Oct. 28, 1997

[30]      Foreign Application Priority Data

Nov. 25, 1996 [KR] Rep. of Korea ................. 96-57179

[51] Int. Cl.⁶ .................................................. F16C 17/10
[52] U.S. Cl. ........................................... 384/112; 384/123
[58] Field of Search ................................. 384/112, 123, 384/121, 107, 113

[56]          References Cited

U.S. PATENT DOCUMENTS 5,466,070  11/1995  Nakasugi ........................... 384/112
5,538,347   7/1996  Itoh et al. .......................... 384/123

*Primary Examiner*—Lenard A. Footland
*Attorney, Agent, or Firm*—Sughrue, Mion, Zinn, Macpeak & Seas, PLLC

[57]           ABSTRACT

A fluid bearing apparatus wherein a clearance between a surface of a thrust bearing supporting thrust load and a periphery of a rotary shaft can be adjusted by making a thrust bearing adjustable with respect to an end portion of the rotary shaft. This results in an enhanced efficiency and a stable rotation of the rotary shaft at a high velocity.

8 Claims, 3 Drawing Sheets

FLUID BEARING APPARATUS

BACKGROUND OF THE INVENTION

1. Field of the Invention

The present invention relates to a fluid bearing apparatus, more particularly, to a fluid bearing apparatus wherein the clearance between the surface of a thrust bearing and a rotary shaft can be adjusted by making the thrust bearing movable with respect to an end portion of the rotary shaft.

2. Description of the Related Art

FIG. 1 is a sectional view of an embodiment of a fluid bearing apparatus according to a conventional art.

As shown in the drawing, a thrust bearing 50 is installed at an end of a through hole 25 in a sleeve 20. A rotary shaft 30 is inserted into the sleeve 20. A lower end portion of the shaft 30 faces the thrust bearing 50 which supports a vertical thrust load of the shaft 30. A first dynamic pressure generating groove 50a is formed on the upper surface of the thrust bearing 50. The sleeve 20 is fastened to the thrust bearing 50 with a clamp screw or the like. In the sleeve 20, an air vent 20a is formed to ventilate air between the thrust bearing 50 and the shaft 30. Furthermore, a second dynamic pressure generating groove 30a having a herringbone shape is formed on the outer surface of the shaft 30 inserted into the through hole 25, or the inner peripheral surface of the sleeve 20.

When the shaft 30 is revolved, a clearance is created between the thrust bearing 50 and the lower end portion of the rotary shaft 30. When the clearance is wide, the shaft 30 may be vibrated and oscillated. On the other hand, when the clearance is narrow, a high pressure and heat are generated between the lower end portion of the shaft 30 and the thrust bearing 50. Heat causes the thrust bearing 50 and the shaft 30 to fuse with each other. As a result, the revolution of the shaft 30 may be stopped. For this reason, the clearance between the lower end portion of the shaft 30 and the thrust bearing 50 is a critical factor for high accuracy and high speed revolution of the fluid bearing apparatus.

In the conventional fluid bearing apparatus, the clearance is extremely narrow in the range of several to several dozen $\mu$m. Accordingly, an actual clearance during the operation of the bearing apparatus may be different from an originally designed clearance between the surface of the thrust bearing 50 and the lower end portion of the shaft 30, due to a variation in the length of the shaft 30 or in the depth of the dynamic pressure generating groove. In addition, friction and abrasion of the thrust bearing and the shaft in repeatedly using the bearing apparatus cause the clearance between the bearing and the shaft to be wider than the originally designed clearance. Therefore, an adjustment in the clearance between the thrust bearing and the shaft for using the bearing apparatus is needed.

However, there is a disadvantage that after the thrust bearing and the shaft are assembled, it is impossible to adjust the clearance between the thrust bearing and the shaft in the fluid bearing apparatus according to the embodiment using the conventional art.

SUMMARY OF THE INVENTION

The present invention has been made to overcome the above described problem of the conventional art. It is an object of the present invention to provide a fluid bearing apparatus wherein a clearance between a shaft and a thrust bearing can be adjusted.

To accomplish the above object of the present invention, there is provided the fluid bearing apparatus comprising: a sleeve installed at a side of a bearing bracket; a rotary shaft inserted into a through hole formed in the sleeve, and having a second dynamic pressure generating groove formed on an outer surface of the rotary shaft facing an inner peripheral surface of the through hole; a thrust bearing installed at a position opposed to an end portion of the rotary shaft, and having a first dynamic pressure generating groove on a surface of the thrust bearing opposed to an end portion of the rotary shaft; and a thrust bearing moving unit for moving the thrust bearing with respect to the end portion of said rotary shaft.

Preferably, the thrust bearing moving unit includes a thrust bearing support installed at the other side of the bearing bracket; and a thrust bearing movably inserted into the thrust bearing support. More preferably, the thrust bearing support includes a screw hole formed therein, and the thrust bearing includes a spiral surface on periphery thereof, the spiral surface of the thrust bearing engaged with the inner circumference of the screw hole. Preferably, the thrust bearing includes a screw hole formed on a side thereof for rotating and moving the thrust bearing. Selectively, the thrust bearing includes a knob formed on the side thereof for rotating and moving the thrust bearing.

Preferably, the thrust bearing includes a surface opposed to the rotary shaft and having a hemispheric shape.

Furthermore, the fluid bearing apparatus includes: an upper and a lower sleeve respectively installed at an end of an upper and a lower bearing bracket; a rotary shaft inserted into an upper and a lower through hole respectively formed in the upper and the lower sleeves, and having a second dynamic pressure generating groove on an outer surface of the rotary shaft facing the inner periphery of the through holes; and an upper and a lower thrust bearing installed at positions respectively opposed to end portions of the rotary shaft, and each having a first dynamic pressure generating groove on the surfaces of the upper and the lower thrust bearings opposed to the end portions of the rotary shaft; and a thrust bearing support installed at the other side of one of the bearing brackets, any of the upper and the lower thrust bearings movably inserted into the thrust bearing support.

Preferably, the thrust bearing support is installed at the other side of the other of the bearing brackets, and one of the thrust bearings is movably inserted into the thrust bearing support.

BRIEF DESCRIPTION OF THE DRAWINGS

The above object and other advantages of the present invention will become more apparent by describing in detail the preferred embodiment thereof with reference to the attached drawings, in which.

DETAILED DESCRIPTION OF THE PREFERRED EMBODIMENTS

The accompanying drawings, which are included to provide a further understanding of the present invention and are incorporated in and constitute a part of this specification, illustrate embodiments of the present invention, and serve to explain the principles of the present invention together with the description. For description purposes, elements having basically the same function as previously described conventional elements are identified using the same or similar reference numbers throughout the drawings.

A fluid bearing apparatus according to a preferred embodiment of the present invention will be described in detail with reference to the accompanying drawings.

Figure 1:
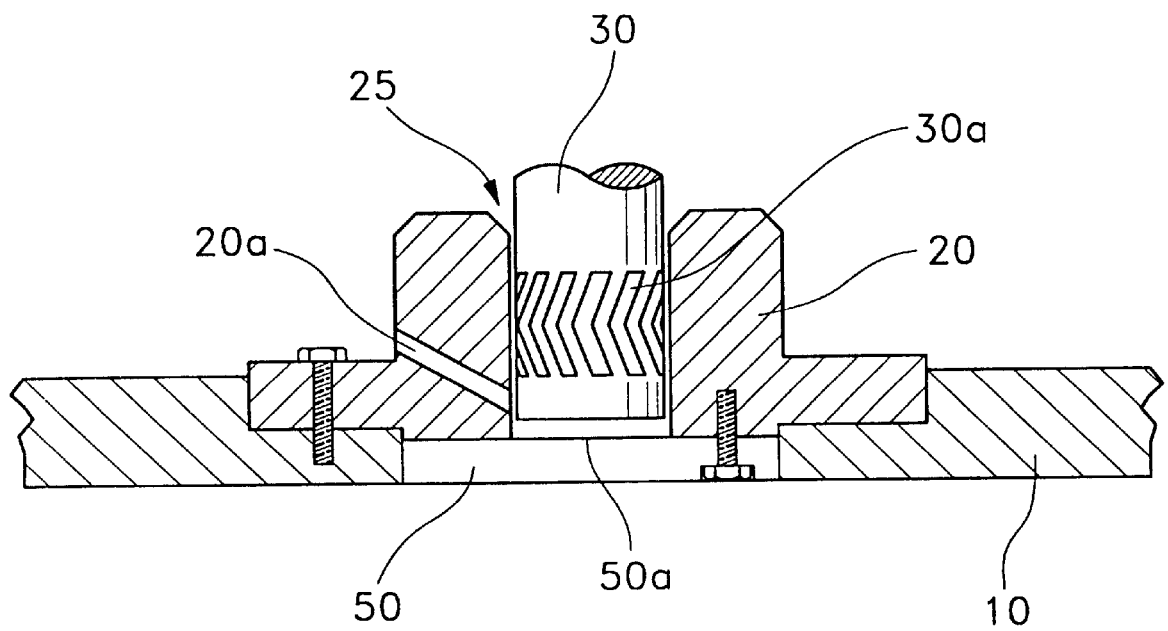
FIG. 1 is a sectional view of a thrust bearing according to an embodiment using the conventional art.
Figure 2A:
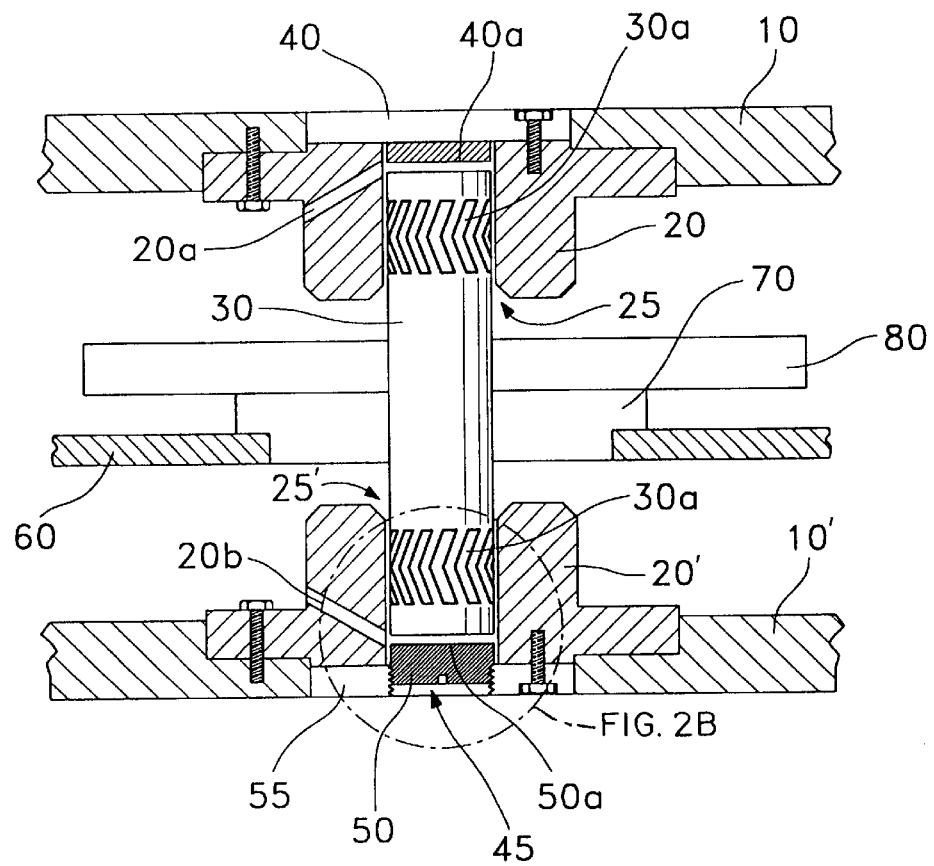
FIG. 2 is a sectional view of a thrust bearing according to an embodiment of the present invention, which is applied to a polygonal mirror driving apparatus of a laser printer.
Figure 2B:
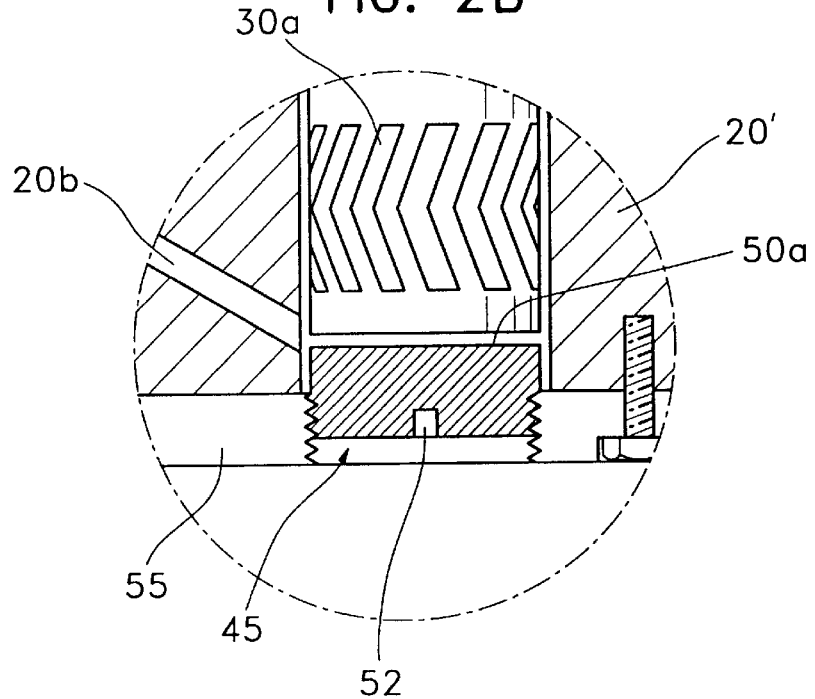

Referring to FIG. 2, an upper and a lower sleeve 20 and 20' respectively are inserted into each end of an upper and a lower bearing bracket 10 and 10', and are fastened to the bracket 10 and 10' by means of clamp screws. An upper thrust bearing 40 is inserted into the other end of the upper bearing bracket 10, and is fastened to the upper sleeve 20 by means of a clamp screw. A lower thrust bearing 50 and a thrust bearing support 55 are inserted into the other end of the lower bearing bracket 10', and are fastened to the lower sleeve 20' by means of a clamp screw.

An upper and a lower through hole 25 and 25' are respectively formed in the upper and the lower sleeves 20 and 20'. A rotary shaft 30 is inserted into the through holes 25 and 25'. The upper and the lower sleeves 20 and 20' respectively have air vents 20a and 20b for exhausting air between the shaft 30 and the upper thrust bearing 40 and between the shaft 30 and the lower thrust bearing 50, or for preventing any change in the air pressure in association with a volume expansion of the above components due to a change in the temperature.

On a peripheral surface of the shaft 30 inserted into the through holes 25 and 25' in the upper and the lower sleeves 20 and 20', or on an inner periphery of the sleeves 20 and 20' facing the peripheral surface of the shaft 30, a second dynamic pressure generating groove 30a having a herringbone shape is formed. Preferably, the angle between the second dynamic pressure generating groove 30a and a line which is horizontal with respect to the bearing brackets 10 and 10' and crosses angled points of the second dynamic pressure generating groove 30a is approximately thirty degrees, and the depth of the groove is several $\mu$m.

A first dynamic pressure groove 40a having a spiral groove is formed on the surface of the upper thrust bearing 40 facing an upper end portion of the shaft 30. Preferably, the spiral shaped groove has a depth of several $\mu$m by an etching process.

A polygonal mirror 80 for reflecting a laser beam to a light-sensitive drum (not shown) of a laser printer and a hub 70 are fixed to the center portion of the shaft 30. A plate 60 (partially shown) is jointed to the hub 70 so that the shaft 30 revolves together with the plate 60 when the plate 60 is rotated.

A screw hole 45 having a predetermined diameter is formed at the center of the thrust bearing support 55. Preferably, the diameter of the screw hole 45 corresponds to the diameter of the through hole 25' of the sleeve 20'. The lower thrust bearing 50 has a diameter corresponding to the diameter of the screw hole 45, and includes a spiral surface which is engaged with the inner peripheral surface of the screw hole 45. A first dynamic pressure generating groove 50a having a spiral groove is formed on the surface of the lower thrust bearing 50 facing a lower end portion of the shaft 30. Preferably, a screw hole 52 is formed at the bottom of the lower thrust bearing 50.

The operation of the fluid bearing apparatus according to the embodiment of the present invention applied to a polygonal mirror driving scanner motor of a laser printer will be described hereinafter.

First, the upper sleeve 20 is inserted into and fixed to a side of the upper bearing bracket 10, and the upper thrust bearing 40 is inserted into and fixed to the other side of the upper bearing bracket 10. The lower sleeve 20' is inserted into and fixed to a side of the lower bearing bracket 10', and the lower thrust bearing support 55 is inserted into and fixed to the other side of the lower bearing bracket 10'. Thereafter, the lower thrust bearing 50 is inserted into the screw hole 45 of the lower thrust bearing support 55 and it is engaged with the lower thrust bearing support 55.

The rotary shaft 30 is then inserted into the sleeves 20 and 20' fixed to the upper and the lower brackets 10 and 10'. The hub 70 to which the polygonal mirror 80 and the plate 60 are jointed, is fixed to the shaft 30 in advance. The scanner motor is completed by incorporating the upper and the lower brackets 10 and 10' with each other.

If power is supplied to the scanner motor, the plate 60 is rotated. The shaft 30 is then revolved together with the polygonal mirror 80 fixed to the shaft 30 when the plate 60 is rotated. At this time, a fluid is introduced into the first dynamic pressure generating grooves 40a and 50a formed on the surfaces of the upper and the lower thrust bearings 40 and 50 facing the upper and the lower end portions of the shaft 30. The fluid flows from the edge portions into the center portions of the grooves 40a and 50a. As a result, a predetermined fluid pressure is generated. At this time, the shaft 30 is revolved without contacting with the upper and the lower thrust bearings 40 and 50.

In the event that the clearance between the lower thrust bearing 50 and the shaft 30 is not sufficient or excessive, the shaft 30 is not capable of revolving at a high velocity. This results in movement and vertical oscillation of the shaft 30.

According to the present invention, when the movement and vertical oscillation of the shaft 30 occur, the clearance between the lower thrust bearing 50 and the lower end portion of the shaft 30 can be adjusted by rotating the lower thrust bearing 50 using the screw hole 52 formed at the bottom of the lower thrust bearing 50. For example, if the screw hole 52 is revolved in the clockwise direction, the lower thrust bearing 50 is moved up. As a result, the clearance is reduced. If the screw hole 52 is revolved in the counter-clockwise direction, the lower thrust bearing 50 is moved down. As a result, the clearance is enlarged. In this manner or vice versa, the clearance can be suitably adjusted according to the revolution state of the shaft 30 so that the shaft can be revolved at a high velocity or at a constant velocity.

Figure 3A:
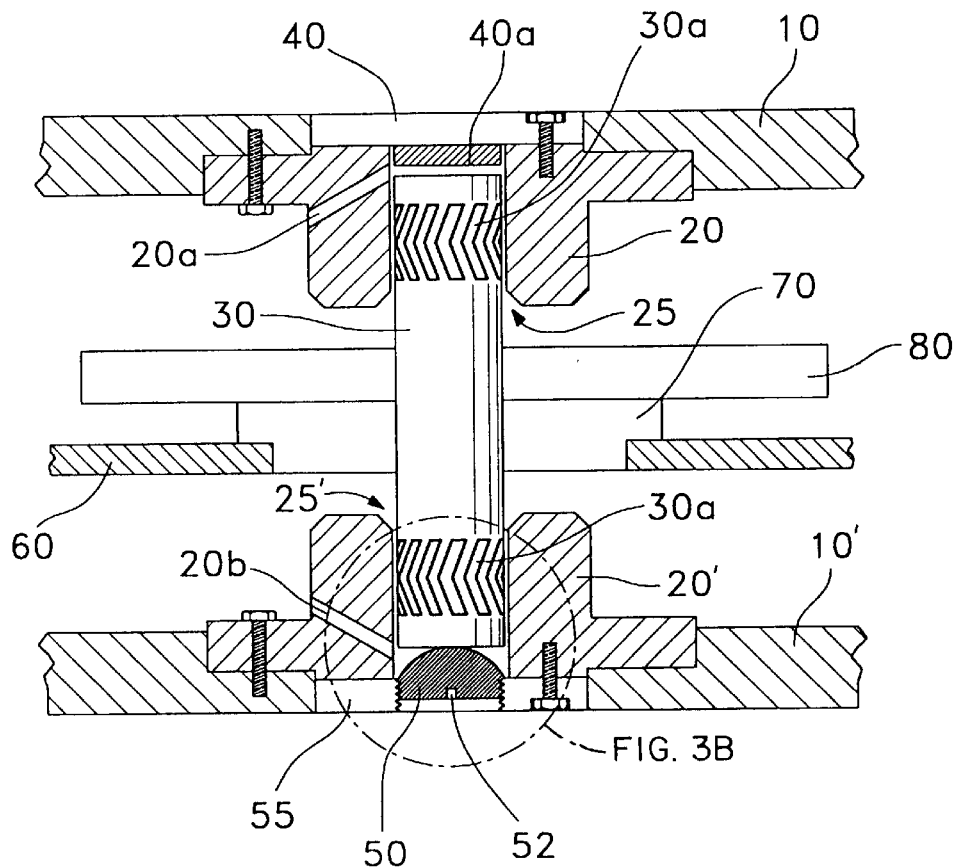
FIG. 3 is a sectional view of a thrust bearing according to another embodiment of the present invention.
Figure 3B:
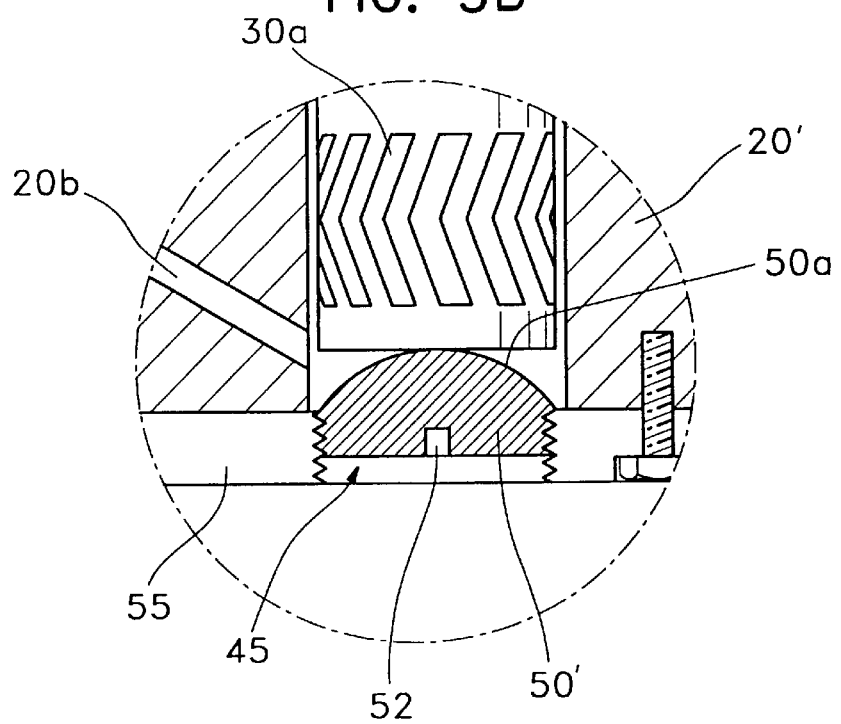

FIG. 3 is a sectional view of another fluid bearing apparatus according to another embodiment of the present invention. For description purposes, elements having basically the same function as previously described elements are identified using similar reference numbers in the drawing, and description thereof is omitted below.

In this embodiment, a lower thrust bearing 50' has a diameter corresponding to the diameter of a screw hole 45 and includes a spiral surface formed on periphery thereof. The spiral surface of the lower thrust bearing 50' is engaged with the spiral surface formed on the inner periphery of the screw hole 45. The surface of the lower thrust bearing 50' facing the lower end portion of the shaft 30 has a hemispherical shape. Accordingly, the lower thrust bearing 50' makes a point-contact with the end portion of the shaft 30. A first dynamic pressure generating groove 50a having a spiral surface having a predetermined area is formed on its surface facing the shaft 30. Preferably, a screw hole 52 is formed at the bottom of the lower thrust bearing 50'.

According to the embodiment, since the lower end portion of the shaft 30 point-contacts with the lower thrust bearing 50' even when the shaft 30 is at a standstill, friction can be minimized.

In the event that the shaft 30 is vibrated or oscillated, the clearance between the lower thrust bearing 50' and the shaft 30 can be adjusted in the same manner described with the first embodiment without any degradation of the efficiency.

As aforementioned, the clearance between the shaft and the thrust bearing which supports the thrust load can be adjusted by making the lower thrust bearing vertically movable with respect to the shaft, in such a manner that the thrust bearing is jointed to the thrust bearing support by means of a screw. This results in an enhanced efficiency of the fluid bearing apparatus capable of revolving the shaft at a stable high velocity.

This invention has been described above with reference to the preferred embodiments. It is evident, however, that many alternative modifications and variations will be apparent to those skilled in the art in light of the foregoing description. In other words, the present invention is not restricted to the above embodiments of the lower thrust bearing, and it is clearly understood that it can be applied to the upper thrust bearing. The present invention may further include a knob attached to the screw hole formed at the bottom of the thrust bearing for facilitation.

What I claim is:

1. A fluid bearing apparatus comprising:

a sleeve installed at one side of a bearing bracket;

a rotary shaft inserted into a through hole formed in said sleeve, and having a second dynamic pressure generating groove formed on an outer surface thereof facing an inner surface of the through hole;

a thrust bearing installed at a position opposed to an end portion of said rotary shaft, and having a first dynamic pressure generating groove on an upper surface thereof opposed to the end portion of said rotary shaft; and a thrust bearing moving unit for moving said thrust bearing with respect to the end portion of said rotary shaft.

2. A fluid bearing apparatus of claim 1, wherein said thrust bearing moving unit comprises:

a thrust bearing support installed at an other side of the bearing bracket; and a thrust bearing movably inserted into said thrust bearing support.

3. A fluid bearing apparatus of claim 2, wherein said thrust bearing support includes a screw hole formed therein, and said thrust bearing includes a spiral formed on a side thereof, said thrust bearing engaged with said screw hole.

4. A fluid bearing apparatus of claim 3, wherein said thrust bearing includes a screw hole formed on a lower surface thereof for rotating and moving said thrust bearing.

5. A fluid bearing apparatus of claim 4, wherein a diameter of said screw hole corresponds to a diameter of the through hole of said sleeve.

6. A fluid bearing apparatus of claim 3, wherein said thrust bearing includes a knob formed on the lower surface thereof for rotating and moving said thrust bearing.

7. A fluid bearing apparatus of claim 4, wherein a diameter of the thrust bearing corresponds to a diameter of said screw hole.

8. A fluid bearing apparatus of claim 1, wherein a polygonal mirror and a hub are fixed to a center portion of said rotary shaft and wherein a plate is jointed to said hub so that said shaft revolves together with said plate when said plate is rotated.

\* \* \* \* \*